D. T. TIMBERLAKE.
TRACTION ENGINE.
APPLICATION FILED AUG. 7, 1907.
927,085.
Patented July 6, 1909.
2 SHEETS—SHEET 2
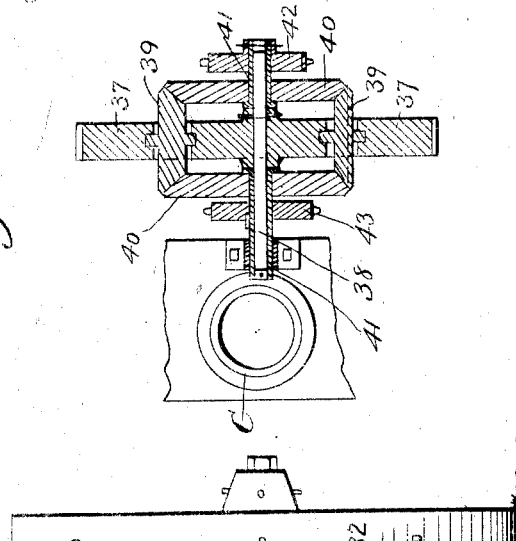
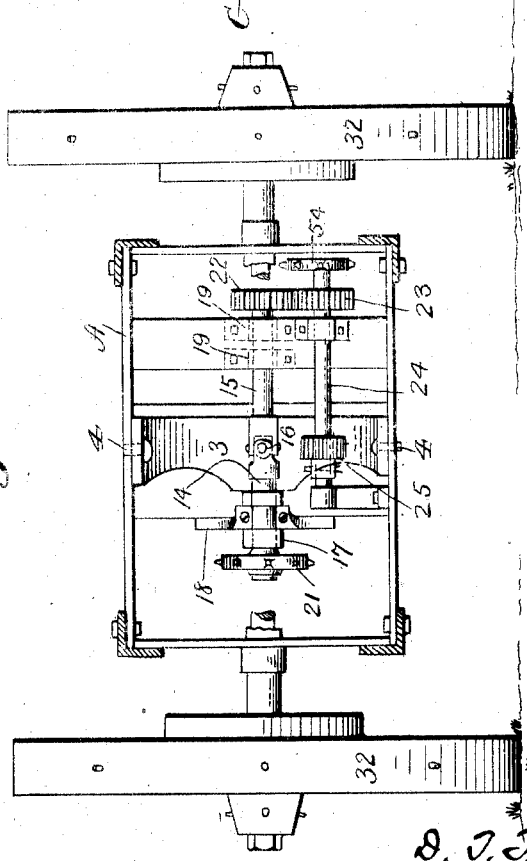
Witnesses
F. L. Ourand
Watts T. Estabrook
Inventor
D. T. Timberlake
Louis Bagger & Co
Attorneys

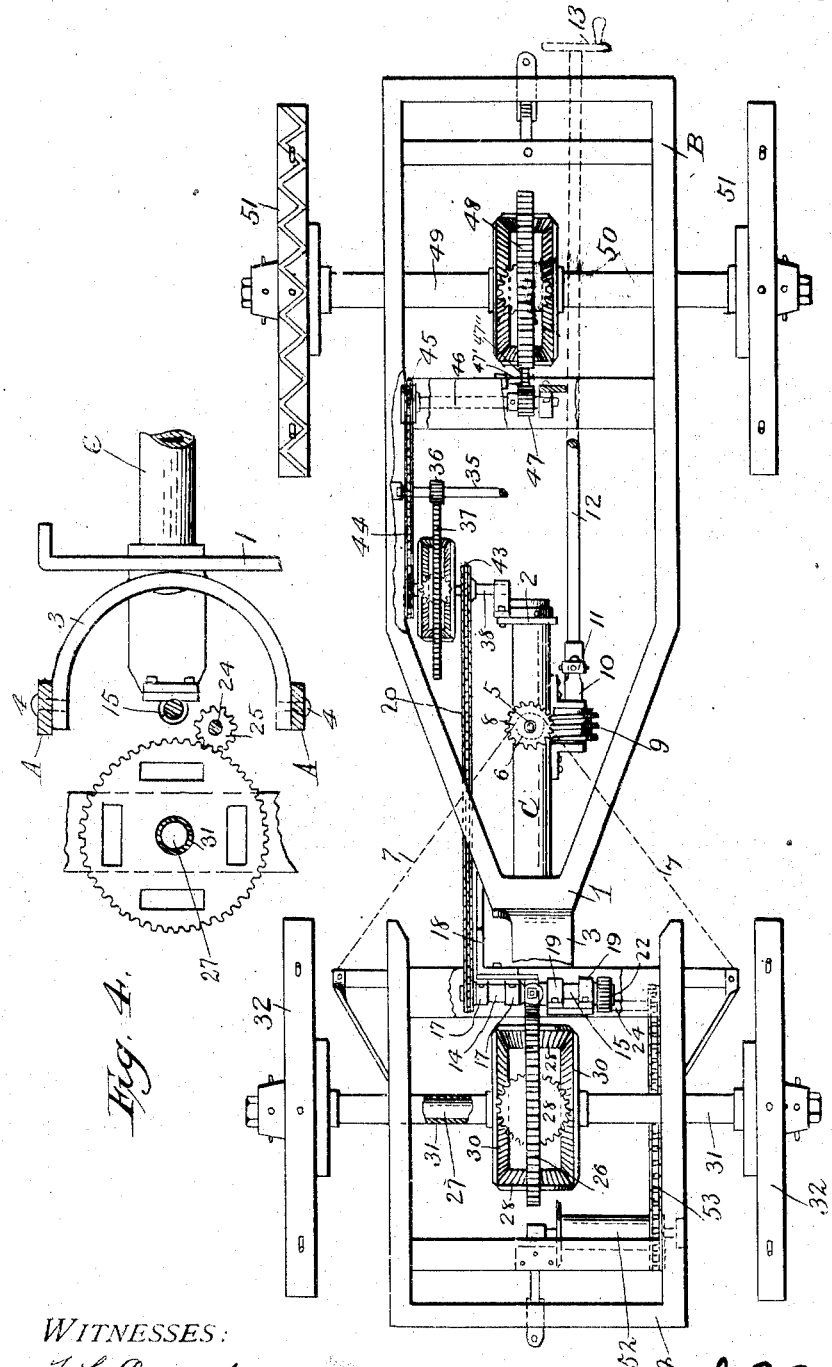

UNITED STATES PATENT OFFICE.

DANIEL T. TIMBERLAKE, OF BAILEYVILLE, KANSAS.

TRACTION-ENGINE.

No. 927,085.     Specification of Letters Patent.     Patented July 6, 1909.

Application filed August 7, 1907. Serial No. 387,529.

*To all whom it may concern:*

Be it known that I, DANIEL T. TIMBERLAKE, a citizen of the United States, residing at Baileyville, in the county of Nemaha and State of Kansas, have invented certain new and useful Improvements in Traction-Engines, of which the following is a specification.

My invention relates to an improvement in traction engines, and the present invention has relation to, and is, an improvement on the invention disclosed in my application for Letters Patent filed in the United States Patent Office April 25, 1907, Serial #370,259.

The primary object of my present invention is to simplify the mechanism of my former construction without losing the advantages of any of the meritorious features of that machine. In other words, it is an object of the present invention, as in the former invention, to provide a traction engine in which the entire weight will be distributed and equalized on the 2 trucks and 4 wheels.

It is also an object to equalize the power of the wheels and make it uniform so that the full power of the engine is brought under and uniformly to all 4 traction wheels whether the machine be on a straight course or making a turn, whether it be on level or sloping course, or whether the wheels of one truck be on a level surface and the front truck be "craning" or vice versa.

The minor objects are to provide for reducing friction to a minimum, to provide for a readily equipped machine for removing purposes, as for instance, for adjusting any other machine which may have been ditched or fallen over an embankment, or for propelling a machine.

With the foregoing as well as other objects in view, my invention consists of 2 trucks supported on traction wheels and connected by a swiveling reach which has the effect of a universal jointed connection between the 2 trucks, in connection with a jointed counter shaft and a transmission gearing for communicating motion for the purpose of communicating power uniformly to the traction wheels.

My invention further consists in certain novel features of construction and combination of parts which will be herein described and brought out in the claims.

In the accompanying drawings Figure 1 is the plan view of my improved traction engine, Fig. 2 is a transverse vertical sectional view on an enlarged scale, Fig. 3 is a section through one of the equalizers, and Fig. 4 is a fragmentary view showing the forward end of the reach, or main wheel of the front axle equalizer and the jointed counter shaft in section.

A and B represent the front and rear trucks on my improved traction engine, and C is the reach which connects the front and rear trucks together. This reach is preferably hollow and is swiveled in the forward end 1 of the rear truck as shown in Fig. 4, as well as in the plate 2 of the rear truck. The forward end of the reach is provided with the yoke 3, the forward end of the yoke is pivoted and connected with the top and bottom frame work of the forward truck A by means of the pins or bolts 4, 4, whereby the forward truck is capable of swinging to either one side or the other in turning the machine, or of tilting upon an irregular surface or upon striking a stone, or stump or other obstruction without interfering with the action of any of the traction wheels.

As a means of turning the forward truck a vertical shaft 5 is provided at the lower end with a sprocket wheel 6, over which a chain 7 extends to the opposite side of the forward truck to which its ends are attached as shown in Fig. 1. This vertical shaft 5 has a worm wheel 8 keyed or otherwise secured thereon. The worm 9 on the stub 10 engages the worm wheel. This stub 10 has a universal chain connection 11 with the shaft 12, and the shaft 12 has a crank wheel 13 on its rear end by means of which the shaft and worm are turned from the rear end of the machine, when the operator desires to change the direction of the machine.

A jointed counter shaft composed of 2 sections 14 and 15, connected together by the universal chain 16, is so arranged and constructed that the section 14 is journaled in a bar 17, 17 secured on the bracket 18 which latter projects forwardly from the front end of the truck B and the other section 15 is journaled in brackets 19, 19 secured to the frame of the forward truck A, so that section 14 maintains a uniform position with respect to the truck B whereas section 15 maintains a uniform position with respect to the truck A, the universal joint 16 between them always admitting all these without any tendency even to bind regardless of the position of the front truck though turning to the right or left or in a tilted position resulting from irregularity in the surfaces over which it passes or one of its wheels causing an obstruction in its path. This jointed counter shaft is the transmitting mechanism for the front trucks it being drawn through a sprocket chain 20 which passes over a sprocket wheel 21 on the outer end of section 14. The outer end of section 15 of this counter shaft is provided with a pinion 22 and this pinion meshes with a pinion 23 on a shaft 24 beneath and parallel with the jointed counter shaft. The shaft 24 has a pinion 25 on its inner end and this pinion intermeshes with the large central spur wheel of the equalizer 26, this equalizer being similar to the equalizer described in my pending application previously mentioned. The central spur wheel of the equalizer is loosely mounted on the solid axle 27 of the front truck and carries the beveled pinions 28, 28 which latter engage the large beveled pinions 30, 30 keyed on the hollow axle shafts 31, 31 to which the forward truck wheels 32, 32 are secured. Power is communicated to this gearing from a suitable engine or motor through a drive shaft 35. This drive shaft 35 has a pinion 36 thereon, and this pinion 36 intermeshes with the large spur wheel 37 of an equalizer carried by the rear truck B and located between the front and rear axles. The large spur wheel 37 in this instance is keyed to the shaft 38 and carries the beveled pinions 39, 39 journaled within itself. Said pinions 39, 39 mesh with bevel gears 40, 40 keyed on the hollow shafts 41, 41, and the sprocket wheels 42 and 43 are secured to said shafts. The sprocket chain 20 is driven by the sprocket wheel 43 and the sprocket wheel 42 drives the chain 44, which passes over a sprocket wheel 45 on a shaft 46 which latter has a small pinion 47 keyed on its inner end and this pinion 47 meshes with a gear 47'' mounted on the stub shaft 47' and the gear 47'' meshes with the main wheel 48 of the rear axle equalizer, and through this equalizer the hollow shafts 49 and 50 which carry the rear traction wheels 51, 51, are driven. A winding drum 52 on the forward truck is driven by a sprocket chain 53 passing from the sprocket wheel 54 on one end of the shaft 24.

It will be understood that this traction engine may not only be used for propelling purposes, but also it might be utilized at any time as a stationary engine for driving other machines.

The pinions 25 and 47 are capable of being shifted out of mesh with the gear wheels engaged, when the power of the machine is to be used for other purposes than propulsion as in this way the wheels are left stationary.

From the foregoing it will be seen that I have greatly simplified the mechanism of my former traction engine by reducing the number of parts without in any way sacrificing strength, power, or uniformity of action as the present machine has all of the advantages brought out in the former machine with the added advantage of simplicity hereinbefore cited.

Slight changes might be made in the form and arrangement of the several parts described without departing from the spirit and scope of the invention, and hence I do not wish to limit myself to the exact construction herein set forth, but—

Having fully described my invention, what I claim as new and desire to secure by Letters Patent is:—

1. In a traction engine, the combination with front and rear trucks and a swiveling reach connecting the trucks together and constituting in effect a part of the frame, of a jointed counter shaft made in sections and extending transversely of one of the trucks, one of which sections is journaled to the frame of one truck, and the other section to the frame of the other truck.

2. In a traction engine, the combination with front and rear trucks and a swiveling reach connecting the trucks together and constituting in effect a part of the frame, of a jointed counter shaft made in sections and extending transversely of one of the trucks, one of which sections is journaled to the frame of one truck, and the other section to the frame of the other truck, means for driving said jointed counter shaft, and means for transmitting motion from said counter shaft to the axle of one of the trucks.

3. In a traction engine, the combination with two trucks pivotally connected with each other, axles therefor, and a reach having a swiveling connection between the trucks, whereby the two trucks are connected together, of a jointed counter shaft extending transversely of one of the trucks, the joint of which is of the universal type and located in alinement with the pivotal connection between the forward end of the reach and the front truck, one section of said counter shaft being journaled in the frame of one truck, and the other section in the frame of the other truck, and transmitting mechanism for communicating motion to and from said jointed counter shaft.

4. In a traction engine, the combination with two trucks, axles therefor, and traction wheels, of a swiveling reach connecting the trucks, a jointed counter shaft the sections of which are connected with the frames of the two trucks, said jointed counter shaft having a sprocket wheel and gear wheel thereon, a shaft parallel with the jointed counter shaft having two pinions thereon, one intermeshed with the gear wheel on the counter shaft, and an equalizer on the forward axle, the teeth of one wheel of which are intermeshed with the pinion on the shaft which parallels the jointed counter shaft whereby to receive motion therefrom.

5. In a traction engine, the combination with two trucks, axles therefor, and traction wheels, of a swiveling reach connecting the trucks, a jointed counter shaft the sections of which are connected with the frames of the two trucks, said jointed counter shaft having a sprocket wheel and gear wheel thereon, a shaft parallel with the jointed counter shaft having two pinions thereon, one intermeshed with the gear wheel on the counter shaft, and an equalizer on the forward axle, the teeth of one wheel of which are intermeshed with the pinion on the shaft which parallels the jointed counter shaft, whereby to receive motion therefrom, said shaft which parallels the counter shaft having a sprocket wheel thereon, a winding drum having a sprocket wheel and sprocket chain extending around said two last mentioned sprocket wheels for transmitting motion from one to the other.

6. In a traction engine, the combination with two trucks, axles and wheels, of a swiveling reach connecting the trucks, equalizers mounted on the two axles, an intermediate equalizer, a drive shaft for communicating motion to the intermediate equalizer, a jointed shaft parallel with the drive shaft, means for communicating motion from the intermediate equalizer to said jointed shaft, and means on the latter for transmitting motion to the equalizer on one of the axles.

In testimony whereof I affix my signature in presence of two witnesses.

DANIEL T. TIMBERLAKE.

Witnesses:
SAML. W. COCKRELL,
OSMON E. HODGES.